Dec. 12, 1961 R. L. LICH 3,012,521
MONORAIL SYSTEM
Filed June 15, 1959 3 Sheets-Sheet 1
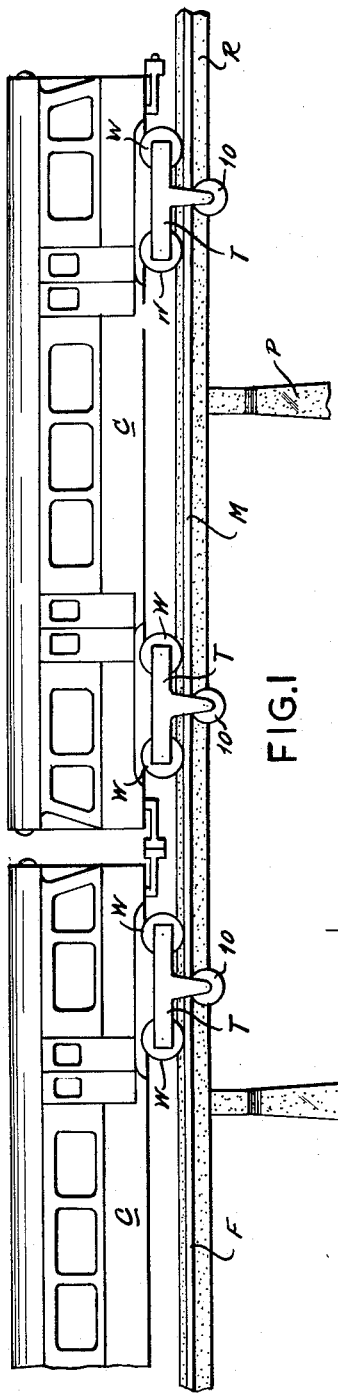
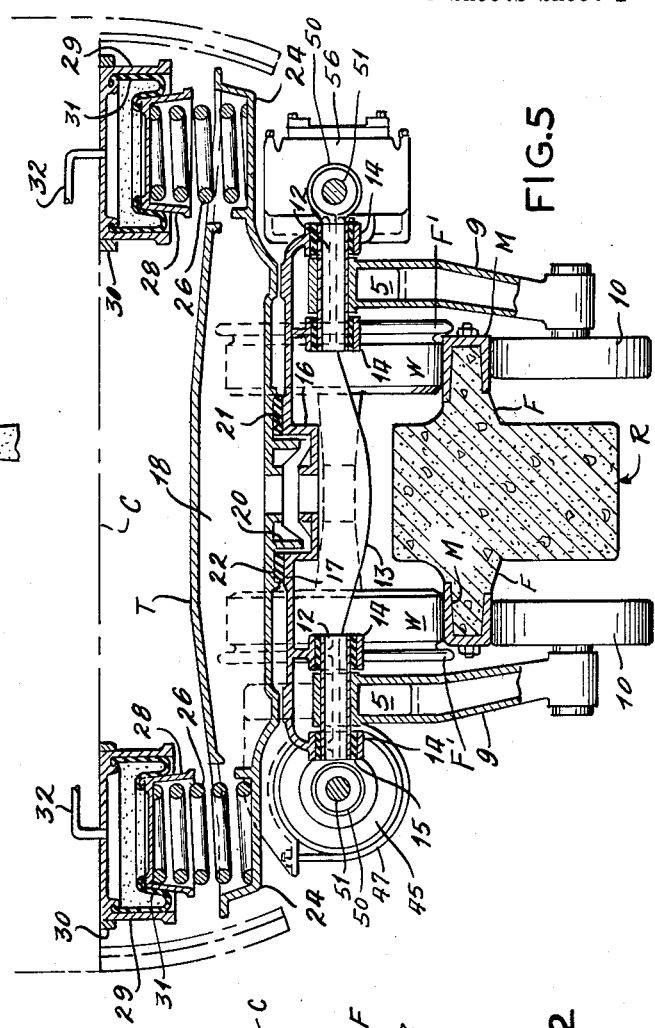
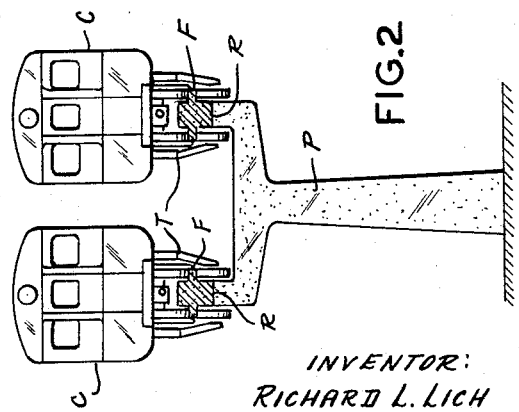
INVENTOR:
RICHARD L. LICH
BY Francis T. Burgess
ATTORNEY.

Dec. 12, 1961 R. L. LICH 3,012,521
MONORAIL SYSTEM
Filed June 15, 1959 3 Sheets-Sheet 2

INVENTOR:
RICHARD L. LICH
BY Francis T. Burgess
ATTORNEYS

Dec. 12, 1961 R. L. LICH 3,012,521
MONORAIL SYSTEM
Filed June 15, 1959 3 Sheets-Sheet 3

INVENTOR:
RICHARD L. LICH
By Francis T. Burgess
ATTORNEY.

3,012,521
MONORAIL SYSTEM
Richard L. Lich, Ferguson, Mo., assignor to General Steel
Industries, Inc., a corporation of Delaware
Filed June 15, 1959, Ser. No. 820,550
6 Claims. (Cl. 105—141)

The invention relates to monorail systems of the type in which the cars overlie the supporting rail structure.

It is an object of the invention to provide a novel track structure and associated trucks for underlyingly-supported monorail cars.

It is a further object to provide monorail cars in which the spring supports of the body are sufficiently widely spaced to provide adequate lateral roll stability under all operating conditions.

It is a further object to provide a light, simple, but fully equalized truck for such a system, including means for maintaining the load-supporting wheels in engagement with the supporting rail surface.

It is a further object to provide a novel arrangement of the motors and driving gear boxes and their associated connections in a truck for a system of this type.

These and other objectives as will appear below are attained by the structure illustrated in the accompanying drawings in which:

FIGURE 1 is a simplified side view of a monorail system embodying the invention.

FIGURE 2 is a transverse vertical sectional view of the monorail system illustrated in FIGURE 1.

FIGURE 5 is a transverse vertical sectional view of the truck along the line 5—5 of FIGURE 4.

Figure 3:
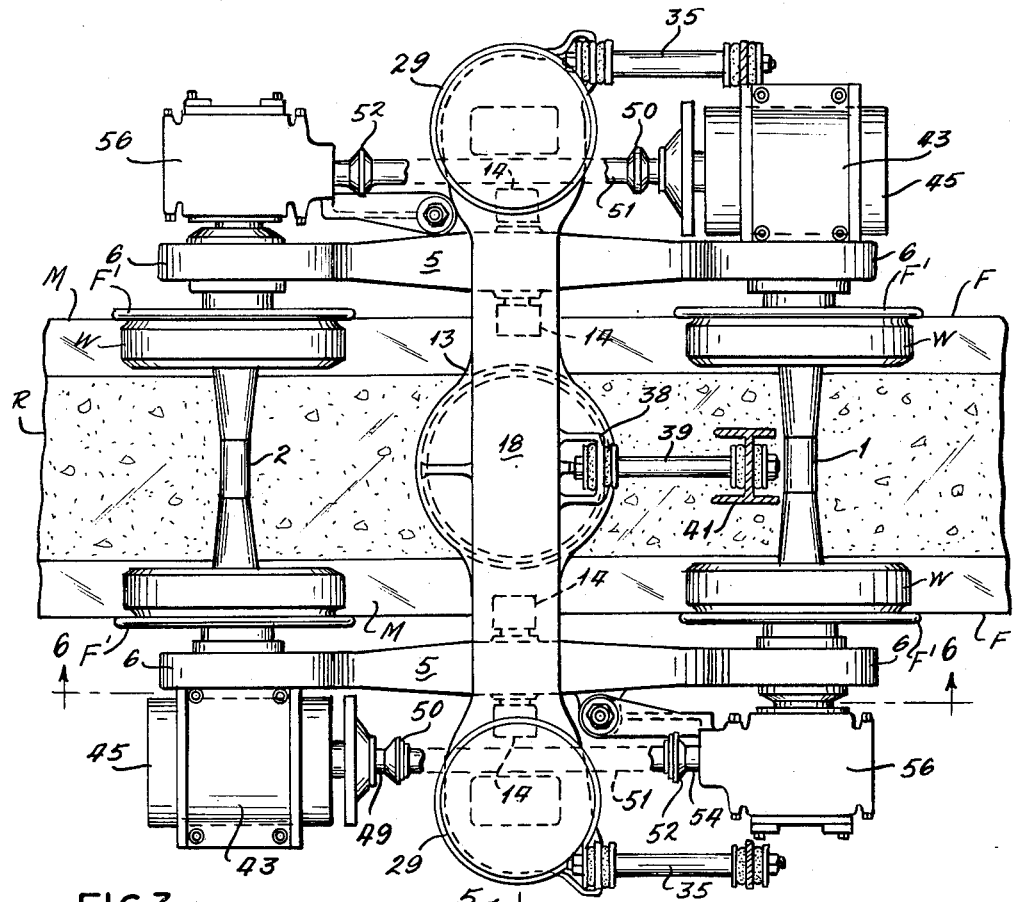
FIGURE 3 is a top view of a monorail truck constructed according to the invention.

Referring first to FIGURES 1 and 2, it will be seen that the supporting structure consists of spaced T-shaped posts P, preferably of reinforced concrete construction, on the ends of the cross members of which are supported a pair of parallel longitudinally-extending cruciform rails R which are preferably cast integral with the cross members. Cruciform rails R each consist of a main beam portion of vertically elongated transverse section formed with outwardly-extending horizontal flanges F on either side. As best seen in FIGURE 5, the outer portions of flanges F are encased in steel channel members M, which provide smooth, hard wearing surfaces.

Pairs of longitudinally-spaced trucks T, the flanged wheels W of which are supported on the upper surfaces of channel members M of said flanges F with the wheel flanges F' engageable with the upright outer surfaces of members M, mount car bodies C in a manner which will be described in greater detail hereinafter. The wheel flanges F' constitute the preferred means for holding the wheels W against lateral movements on the rail.

Trucks T each include a pair of wheel and axle assemblies comprising laterally-spaced pneumatic-tired, outwardly flanged wheels W and axles 1 and 2 respectively. Journal boxes 3 are rotatably-supported laterally outwardly of the wheels on end portions of axles 1 and 2 and are held in a conventional manner against substantial movement axially of the axles. A pair of transversely-spaced longitudinally-extending side frames 5 are formed at their ends with downwardly-open pedestal jaws 6 in which are vertically slidably received journal boxes 3, there being a pad 7 of resilient material between the top of each box and the downwardly-facing top surface of the pedestal jaws for the purpose of cushioning the side frames against shocks transmitted to the wheel and axle assemblies from irregularities in the rails. Journal boxes 3 are held in a conventional manner against substantial nonvertical movement relative to the side frames, so that there is no relative lateral movement between the side frames and the wheels. It will accordingly be evident that the wheel flanges F' are held against substantial lateral movement relative to the side frames and thus hold these and other parts of the truck centered laterally with respect to the rail. Side frames 5 are each formed intermediate their ends with a depending portion 9 which extends substantially below rail flanges F and at its lower end pivotally mounts a small pneumatic-tired wheel 10 underlyingly engaging the rail flange F for the purpose of retaining the wheels W in constant engagement with the upper surfaces of rail flanges F.

Intermediate their ends, each of the side frames rigidly mounts a transversely-extending tubular member 12 which extends laterally in both directions from the associated side frame and forms a pivot for mounting a transversely extending transom 13 on the side frames. For accommodating tilting of the side frames lengthwise of the truck relative to the transom 13 while maintaining the side frames constantly at right angles to the longitudinal axis of the transom and parallel to each other, the transom is formed at each end with transversely-extending cylindrically-recessed depending brackets 14 spaced apart transversely of the truck and pivotally-receiving the projecting ends of members 12, there being bushings 15 of rubber or rubber-like material between the co-operating surfaces of said tubes and said brackets to provide a yieldable resistance to tilting movements of side frames 9. Transom 13 is of inverted channel cross section, and intermediate its ends its top wall is vertically cylindrically-recessed downwardly at 16 and there is a horizontal annular surface 17 formed on the top surface of the top wall of the bolster surrounding recess 16. A transversely-extending box section bolster 18 is formed with a depending vertical cylindrical projection 20 on its lower wall, projection 20 being pivotally received within recess 16 of transom 13, and a horizontal annular surface 21 is formed on the bottom of the bolster, surrounding cylindrical projection 20, the bolster 18 being supported on transom 13 by an annular disc 22 of friction material interposed between the opposing annular surfaces. The relatively large diameter of the opposing annular surfaces prevents relative tilting between the transom and bolster in any direction, and the friction material resists tendencies of the truck to oscillate about its vertical axis relative to the bolster, while accommodating necessary swiveling movements on curved track. Bolster 18 extends laterally outwardly a substantial distance from the side frames 5 and terminates in upwardly-open spring seats 24 at each end. Spring seats 24 each mount upright coil springs 26 upon which are seated downwardly-open cup-like caps 28. Caps 28 are vertically- and laterally-movably received within a larger downwardly-open cup 29 on which the car body C is directly supported and secured against horizontal movement with respect thereto by depending flanges 30 surrounding cups 29. An air tight chamber is formed in the space between cap 28 and cup 29 by flexible wall member 31 which is connected at its upper end to the inner portion of cup 29 and at its lower end to the upper portion of member 28 and is adapted to roll respectively with respect to the outer surfaces of member 28 and the inner surfaces of member 30 to accommodate vertical and lateral movements of the cap 28 and cup 29 relative to each other. Air under super-atmospheric pressure is introduced into the chamber formed by cap 28, cup 29 and flexible wall member 30 by suitable piping 32, the supply of air being controlled automatically or manually in well known manners to maintain the body height substantially constant throughout the loading range.

Since bolster 18 is capable of swivel with respect to the truck frame, it is not necessary that it swivel with respect to the car body, and to prevent swiveling between bolster and car body, and to prevent tilting of the bolster and transom 13 about an axis extending transversely of the car, the bolster is formed at its ends with upstanding brackets 34 to which are pivotally-secured rods 35 extending longitudinally of the truck and pivotally-connected at their opposite ends to brackets 36 depending from the car body. At its center the bolster is formed with bracket structure 38 at a lower level than side brackets 34, and to bracket 38 is pivotally secured a similar longitudinally-extending rod 39, the opposite end of which is similarly pivotally-secured to a central bracket 41 depending from the vehicle body.

Figure 4:
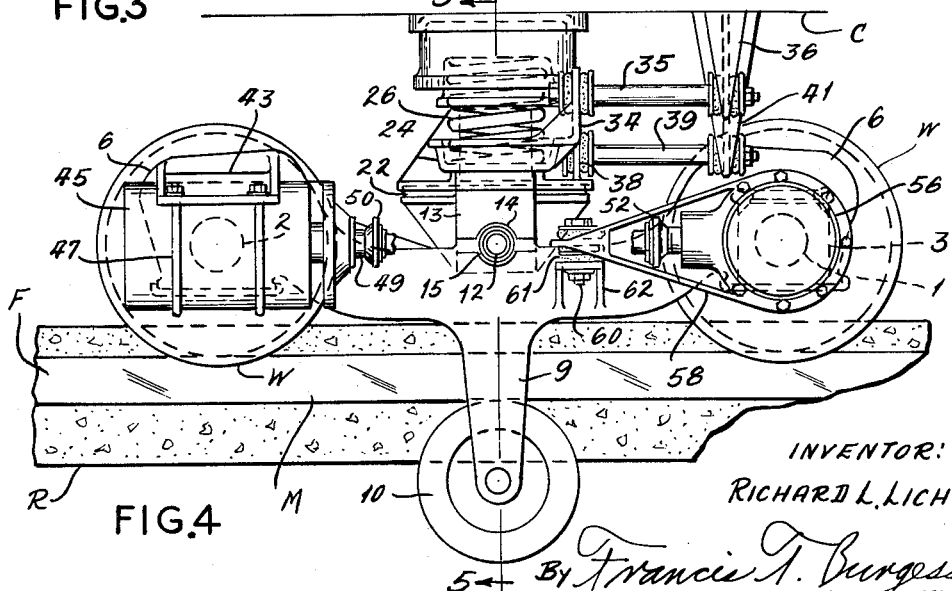
FIGURE 4 is a side view of the truck illustrated in FIGURE 3.
Figure 6:
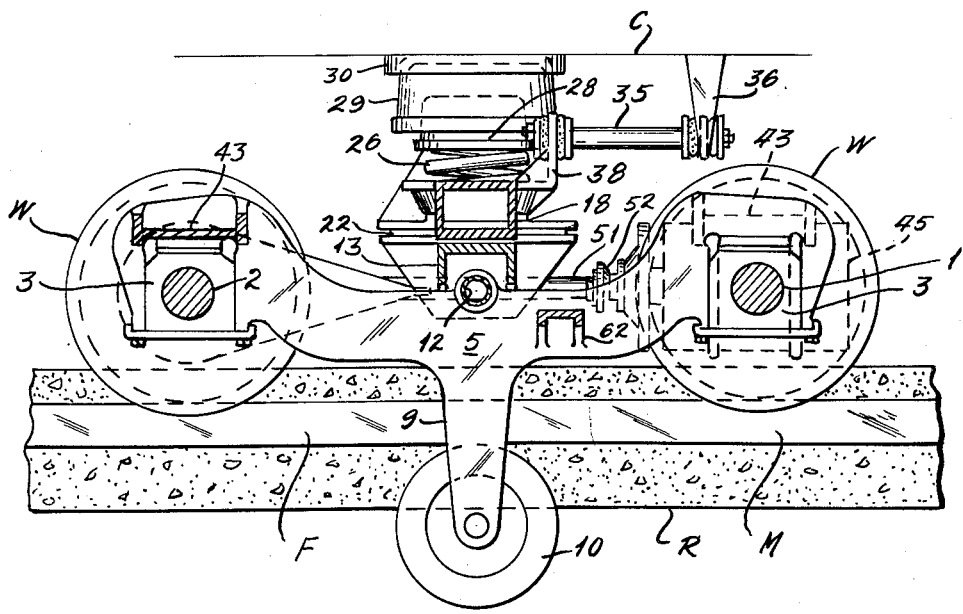
FIGURE 6 is a longitudinal vertical sectional view along the line 6—6 of FIGURE 3.

As best seen in FIGURES 3 and 4, on the left hand end portion of one of the side frames 5 adjacent axle 2, an outwardly-extending arched bracket 43 is formed, and a longitudinally-extending traction motor 45 is suspended from bracket 43 by a pair of U-bolts 47 in a well known manner. Motor shaft 49 is universally-jointed at 50 to drive shaft 51 which is universally-jointed at 52 to the input shaft 54 of gear box 56 mounted on the end of axle 1, gear box 56 being formed with the usual longitudinally-extending torque arm 58, which is resiliently secured at its outer end by means of a bolt 60 and a plurality of rubber pads 61 to outboard bracket 62 on side frame 5. A motor and driving gear box are similarly, though diagonally oppositely, arranged on the opposite side frame so that the opposite motor is carried by the end of the side frame adjacent axle 1 and the gear box is mounted on the corresponding end of axle 2, whereby both axles are driven.

Operation of the system is as follows:

When the motors 45 are energized, both axles of each truck are driven by the motors acting through the associated drive shafts 51 and gear boxes 56, rotation of the gear boxes relative to the side frames being prevented by the torque arm connection to the side frames. As the trucks roll upon the rails R the load-supporting wheel W are retained in rolling engagement with the upper metal surface of the flanges F by the engagement of depending stabilizing wheels 10 with the lower metal surfaces of flanges F, the truck being guided laterally on the supporting rail by the flanges on load-supporting wheels W. In the event of breakage of a flange on the load-supporting wheels, derailment would be prevented by the engagement of the inner surface of that wheel with the upstanding central portion of the rail R. Shocks received from vertical irregularities in the supporting rail structure are partly cushioned by the pneumatic tires and partly absorbed by the ability of the side frames 5 to tilt lengthwise of the truck relative to each other about their common transverse pivot axis on which they are connected to the transom 13. Swiveling movements are accommodated by the pivotally-related cylindrical members on the bolster 18 and transom 13, and vertical tilting movements between bolster and transom are prevented by the co-operating horizontal annular surfaces of these members, oscillations of the truck frame relative to the bolster being resisted by the annular friction disc interposed between these surfaces. Rotation of the bolster about an axis transverse of the truck is resisted by the vertical disposition of the longitudinally-extending rods 35 and 39 connecting the bolster to the car body, and through the co-operating annular surfaces on the bolster and transom, this stability against tilting about vertical axes is transmitted to the transom. Lateral shocks received by the truck and transmitted from the wheels to the bolster are largely absorbed by lateral deflections in the coil and pneumatic springs carried by the bolster ends, and the vertical yieldability of these springs, of course, absorbs much of the vertical shock received by the bolster. The floor height of the car body may be maintained substantially constant throughout the load range so as to maintain uniform coupler heights between cars and eliminate unevenness between station platforms and car floors, by introducing additional air into and exhausting air from the pneumatic springs as required. Lateral roll stability is maintained even with very soft springs by virtue of the great lateral spacing of the springs.

It will be evident that this system has numerous advantages over conventional railway suspension systems, particularly those of the elevated type. It permits the use of a simple yet strong track structure consisting of the cruciform beams carried by T-shaped posts, all being part of a monolithic structure with the wearing surfaces protected by steel channel members. A very narrow track gauge is permitted without adversely affecting the lateral stability of the supported cars, by the provision of the depending stabilizing wheels 10. Since these and the driving wheels W both utilize pneumatic tires, a single stabilizing wheel can be used for each pair of load-supporting wheels and it can be disposed symmetrically longitudinally of the truck with respect to the load-supporting wheels without interfering with the longitudinal tilting or equalizing effect of the side frames relative to each other caused by vertical irregularities in the supporting track structure. The wide spacing of the body-supporting springs on the bolster permits the use of very soft springs without corresponding reduction in roll stability, and the use of the upper pneumatic springs in series with the coil springs permits the maintenance of substantially constant car floor level throughout the load range and eliminates the danger of the combination springs going solid in the event of air pressure failure. The support of the motors and driving gear boxes outboard of the side frames makes possible extremely narrow track gauge, and facilitates maintenance of the motors, drive shafts, and gear boxes, the diagonally opposite arrangement of motors and gear boxes making it possible to drive both axles.

The details of the construction may be varied substantially without departing from the spirit of the invention and the exclusive use of those modifications coming within the scope of the appended claims is contemplated.

What is claimed is:

1. A truck for a monorail system comprising a pair of axles spaced apart longitudinally of the truck, laterally-spaced load-supporting wheels rigidly mounted on said axles and adapted to be supported on the upper surfaces of the rail adjacent the sides thereof, means held against substantial movement laterally of the truck and engageable with the sides of the rail for preventing lateral movements of said wheels on the rail, side frames supported on said axles laterally outboard of said wheels and extending longitudinally of the truck therebetween, said side frames being formed intermediate said wheels with a depending element having a portion extending to a lower level than the lower surface of the rail, stabilizing wheels carried by the side frame depending portions and adapted to engage the lower surface of the rail to retain said load-supporting wheels in engagement with the upper surface of the rail, a transversely-extending member pivotally-connected at its ends on a common transverse axis to both of said side frames whereby said side frames are enabled to tilt lengthwise of the truck relative to each other and to said transverse member, a bolster extending transversely of the truck and swivelly-supported on said transverse member, said bolster having end portions extending laterally outwardly of said side frames, and upright springs supported on the end portions of said bolster and adapted to support a car body.

2. A truck according to claim 1 in which said upright springs comprise vertically-arranged coil and pneumatic springs, said pneumatic springs comprising a rigid cup-shaped lower member carried by said coil springs, a cup-shaped upper member rigidly mounting the supported car body, said upper member being of larger diameter than said lower member and vertically and laterally movably-receiving said lower member within itself, an annular flexible wall member secured at its inner periphery to the upper portion of said lower rigid member and at its outer periphery to the interior of said upper member and adapted to roll on the adjacent surfaces of said members to accommodate relative vertical and lateral movements therebetween, and air passage means communicating with the interior of said chambers for admitting or exhausting air under pressure therefrom.

3. A truck according to claim 1 in which the pivots between said transverse member and said side frames comprise cylindrical elements projecting laterally in both directions from the intermediate portions of said side frames, said transverse member being formed with cylindrical apertures receiving said cylindrical projections, there being rubber-like bushings interposed between said cylindrical projections and the aperture-forming surfaces of said transverse member for accommodating and yieldably resisting pivotal movements of said side frames relative to said transverse member.

4. A truck for a monorail system comprising a pair of axles spaced apart longitudinally of the truck, laterally spaced load-supporting wheels on said axles and adapted to be supported on the upper surfaces of the rail adjacent the sides thereof, means held against substantial movement laterally of the truck and engageable with the sides of the rail for preventing lateral movements of said wheels on the rail, framing including side frames supported on said axles and extending longitudinally of the truck therebetween, each said side frame rigidly mounting intermediate said wheels, a depending element positioned outwardly of the sides of the rail and extending to a lower level than a downwardly-facing surface of the rail, and stabilizing wheels carried by said depending elements and adapted to engage the downwardly-facing surface of the rail to retain said load-supporting wheels in engagement with the upper surface of the rail, said side frames being pivotally connected to each other on an axis transverse of the truck and intermediate said axles whereby said side frames are enabled to tilt lengthwise of the truck relative to each other.

5. A truck for a monorail system comprising a pair of axles spaced apart longitudinally of the truck, laterally spaced load-supporting wheels on said axles and adapted to be supported on the upper surfaces of the rail adjacent the sides thereof, means held against substantial movement laterally of the truck and engageable with the sides of the rail for preventing lateral movements of said wheels on the rail, framing including side frames supported on said axles and extending longitudinally of the truck therebetween, each said side frame rigidly mounting intermediate said wheels, a depending element positioned outwardly of the sides of the rail and extending to a lower level than a downwardly-facing surface of the rail, and stabilizing wheels carried by said depending elements and adapted to engage the downwardly-facing surface of the rail to retain said load-supporting wheels in engagement with the upper surface of the rail, said side frames being pivotally connected to each other on an axis transverse of the truck and intermediate said axles whereby said side frames are enabled to tilt lengthwise of the truck relative to each other, a bolster extending transversely of the truck and swivelly-supported on said framing, said bolster having end portions extending laterally outwardly of said side frames, and upright springs supported on said bolster end portions and adapted to support a car body.

6. A truck for a monorail system comprising a pair of axles spaced apart longitudinally of the truck, laterally-spaced load-supporting wheels rigidly mounted on said axles and adapted to be supported on the upper surfaces of the rail adjacent the sides thereof, means held against substantial movement laterally of the truck and engageable with the sides of the rail for preventing lateral movements of said wheels on the rail, side frames supported on said axles laterally outboard of said wheels and extending longitudinally of the truck therebetween, said side frames being formed intermediate said wheels with a depending element having a portion extending to a lower level than the lower surface of the rail, stabilizing wheels carried by the side frame depending portions and adapted to engage the lower surface of the rail to retain said load-supporting wheels in engagement with the upper surface of the rail, and a transversely-extending member pivotally-connected at its ends on a common transverse axis to both of said side frames whereby said side frames are enabled to tilt lengthwise of the truck relative to each other and to said transverse member.

References Cited in the file of this patent

UNITED STATES PATENTS

| | | |
|---|---|---|
| 816,122 | Pulliam | Mar. 27, 1906 |
| 1,149,764 | Hinsen | Aug. 10, 1915 |
| 2,056,219 | Stout et al. | Oct. 6, 1936 |
| 2,268,267 | Sheesley | Dec. 30, 1941 |
| 2,700,345 | Cox | Jan. 25, 1955 |
| 2,721,523 | McIntosh et al. | Oct. 25, 1955 |
| 2,781,001 | Davino | Feb. 12, 1957 |
| 2,788,749 | Hinsken et al. | Apr. 16, 1957 |
| 2,843,058 | Travilla et al. | July 15, 1958 |
| 2,853,956 | Wenner-Gren et al. | Sept. 30, 1958 |
| 2,907,283 | Markestein et al. | Oct. 6, 1959 |
| 2,908,230 | Dean | Oct. 13, 1959 |
| 2,923,254 | Barthelmess | Feb. 2, 1960 |
| 2,932,258 | Marquard | Apr. 12, 1960 |

FOREIGN PATENTS

| | | |
|---|---|---|
| 537,791 | Belgium | May 14, 1955 |